United States Patent [19]
Perino

[11] Patent Number: 5,995,016
[45] Date of Patent: Nov. 30, 1999

[54] METHOD AND APPARATUS FOR N CHOOSE M DEVICE SELECTION

[75] Inventor: Donald V. Perino, Los Altos, Calif.

[73] Assignee: Rambus Inc., Mountain View, Calif.

[21] Appl. No.: 08/767,739

[22] Filed: Dec. 17, 1996

[51] Int. Cl.[6] .................................................. H04Q 1/00
[52] U.S. Cl. .................. 340/825.52; 327/415; 370/528; 341/102; 326/106; 307/449
[58] Field of Search ................. 340/825.52; 341/102, 341/106, 95; 307/449; 326/106; 370/297, 528; 327/407, 415

[56] References Cited

U.S. PATENT DOCUMENTS

| | | | |
|---|---|---|---|
| Re. 33,676 | 8/1991 | Hoshi | 307/449 |
| 3,646,550 | 2/1972 | Anacker | 340/347 |
| 3,653,034 | 3/1972 | Regitz | 340/347 |
| 3,681,760 | 8/1972 | Salava | 340/172.5 |
| 3,744,024 | 7/1973 | Russell et al. | 340/146.1 |
| 3,846,757 | 11/1974 | Friedman | 340/166 |
| 4,011,549 | 3/1977 | Bormann | 340/173 |
| 4,087,811 | 5/1978 | Weinberger | 340/347 |
| 4,143,359 | 3/1979 | Beelitz | 340/166 |
| 4,284,208 | 8/1981 | Levasseur | 221/129 |
| 4,308,526 | 12/1981 | Smith | 340/347 |
| 4,346,367 | 8/1982 | Leinweber | 340/347 |
| 4,479,126 | 10/1984 | Higuchi et al. | 340/825.8 |
| 4,516,251 | 5/1985 | Gallup | 377/110 |
| 4,577,308 | 3/1986 | Larson et al. | 370/9 |
| 4,584,567 | 4/1986 | Kinghorn | 340/347 |
| 4,618,784 | 10/1986 | Chappell et al. | 307/449 |
| 4,623,872 | 11/1986 | Rainer | 340/347 |
| 4,730,133 | 3/1988 | Yoshida | 307/449 |
| 4,746,855 | 5/1988 | Wrinn | 324/73 |
| 4,752,763 | 6/1988 | Hoffman | 340/146.2 |
| 4,758,744 | 7/1988 | Plus | 307/449 |
| 4,771,281 | 9/1988 | Fox et al. | 340/825 |
| 4,777,390 | 10/1988 | Hoshi | 307/449 |
| 4,817,033 | 3/1989 | Koya | 364/900 |
| 4,843,261 | 6/1989 | Chappell et al. | 309/449 |
| 4,885,481 | 12/1989 | Hobbs et al. | 307/463 |
| 4,949,343 | 8/1990 | Kaneko | 371/57.1 |
| 5,122,979 | 6/1992 | Culverhouse | 364/715 |
| 5,151,868 | 9/1992 | Nishiyama et al. | 364/490 |
| 5,168,551 | 12/1992 | Jeong | 395/27 |
| 5,191,656 | 3/1993 | Forde, III et al. | 395/325 |
| 5,276,439 | 1/1994 | Atsumi et al. | 340/825 |
| 5,317,541 | 5/1994 | Chan | 365/230 |
| 5,319,602 | 6/1994 | Shishikura | 365/230 |
| 5,321,818 | 6/1994 | Wendling et al. | 395/325 |
| 5,327,380 | 7/1994 | Kersh, III et al. | 365/195 |
| 5,349,670 | 9/1994 | Agrawal et al. | 395/775 |
| 5,355,346 | 10/1994 | Shin et al. | 365/230 |
| 5,418,907 | 5/1995 | Ohki | 395/166 |
| 5,436,868 | 7/1995 | Shin et al. | 365/230 |
| 5,469,430 | 11/1995 | Guerin et al. | 370/37 |
| 5,475,640 | 12/1995 | Kersh, III et al. | 365/200 |
| 5,483,085 | 1/1996 | Holm et al. | 257/88 |
| 5,493,565 | 2/1996 | Hanson et al. | 370/55 |

OTHER PUBLICATIONS

Mendenhall et al.; "Statistics for Management and Economics" Fifth Edition, 1978, pp. 3 pages total.

*Primary Examiner*—Brian Zimmerman
*Attorney, Agent, or Firm*—Blakely, Sokoloff, Taylor & Zafman LLP

[57] ABSTRACT

A method for selectively enabling one of X agents in a system so as to allow the selected agent to be active in a shared communication system. The method comprises the steps of assigning each agent to a unique subset M of a plurality of N select lines, M being greater than 1 and less than N, and translating an identification number so as to assert M of the plurality of N select lines. The asserted M select lines uniquely select a designated agent. For one embodiment, all of the X agents may be selected by enabling all N select lines. For another embodiment, more than one but not all of the agents may be selected.

27 Claims, 9 Drawing Sheets

METHOD AND APPARATUS FOR N CHOOSE M DEVICE SELECTION

FIELD OF THE INVENTION

The present invention is related to electronics systems and more particularly to the selection of system devices by a system master.

BACKGROUND OF THE INVENTION

For electronics systems such as computer systems, it is typically necessary to provide one or more system components with the ability to selectively enable the operation of other system components. For example, a system controller or "master" such as a microprocessor may need to enable another system component or "agent" such as a memory chip in order to gain access to the data stored by the memory chip. Device selection is useful in many other systems and circumstances, as well.

There are a number of alternative methods for providing device selection in an electronics or computer system, and each method has an associated cost of implementation. For example, the master and agent devices must typically include additional pins for asserting and accepting selection or enable signals, and there are costs associated with providing semiconductor die space for these pins and supporting circuitry. Similarly, there are costs associated with providing printed circuit (PC) board space for routing the selection or enable signals between the master and agent devices.

FIG. 1 shows a system 10 that implements a prior device selection scheme wherein selection bus 15 transmits a binary encoded identification number from master 20 to select one of agents 21–36 so that master 20 may access the selected agent via data bus 48. To support device selection according to this method, each of agents 21–36 must be provided with (1) a unique identification number such as I.D. NO. 45 of agent 21 and (2) comparator circuitry 40 for comparing the transmitted identification number to the agent's identification number. In a system supporting a maximum of $2^N$ agents, the width of selection bus 15 is N bits, and master 20 and agents 21–36 must each have N pins dedicated or multiplexed for device selection.

The number of output pins required for master 20 is minimized according to the scheme of FIG. 1; however, the total number of input pins required for agents 21–36 is maximized.

FIG. 2 shows a system 50 that implements another prior device selection scheme. A selection bus 55 transmits a binary encoded identification number (shown as BIT 0–BIT 3) and its complement (shown as $\overline{\text{BIT 0–BIT 3}}$) from master 60 to select one of agents 61–76 so that master 60 may access the selected agent via data bus 54. The assertion or deassertion of the select signals for the complementary identification number ($\overline{\text{BIT 0–BIT 3}}$) directly depends on the value of the true identification number (BIT 0–BIT 3). To support device selection according to this method, each of agents 61–76 must be provided with majority logic circuitry such as a logical AND gate 52. In a system supporting a maximum of $2^N$ agents, the width of the selection bus 55 is 2N bits, master 60 must have 2N output pins for device selection, and agents 61–76 must each have N input pins for device selection.

Device selection by the system of FIG. 2 is typically faster than that of FIG. 1 because majority logic circuitry is typically faster than comparators. Furthermore, agents need not be assigned identification numbers. The number of output pins required by the master to support device selection and the number of conductors for the selection bus are both doubled. Therefore, this prior art scheme is typically applied to systems with a limited (e.g. four) number of agents.

FIG. 3 shows a system 80 that implements another prior device selection scheme wherein each of a plurality of enable lines 85 are routed from master 90 to a corresponding one of agents 91–106 so that master 90 may enable and access the selected agent via data bus 115. To support device selection according to this method, master 90 must be provided with a 1-of-16 decoder circuit 110 that accepts a binary number and asserts one of the sixteen enable signals EN1–EN16. In a system supporting a maximum of $2^N$ agents, master 90 must have a 1-of-N decoder providing $2^N$ enable signals on $2^N$ lines. Each of the $2^N$ agents must have one input pin for device selection. Master 90 must have $2^N$ output pins for device selection.

The total number of input pins required for the agent devices is minimized according to the scheme of FIG. 3; however, the number of output pins required for the master device is maximized. An alternative scheme would place the 1-of-16 decoder circuit 100 external to master 90, thus reducing the number of output pins for device selection by master 90. Providing the 1-of-16 decoder circuit 100 as a separate device would slow the process of device selection by an undesirable amount for some systems.

SUMMARY AND OBJECTS OF THE INVENTION

It is an object of the present invention to provide a device selection scheme using combinatorics to determine the number of outputs on a selecting device and the number of inputs on each of a plurality of selectable devices.

Another object of the present invention is to permit the selecting device to select all of the selectable devices simultaneously.

Another object of the present invention is to select sets of the selectable devices simultaneously.

An interconnect apparatus for selecting at least one of a plurality of selectable devices for communication is described. The interconnect apparatus includes a plurality of N select lines and a plurality of connections coupling each of the selectable devices to an unique group of the N select lines. Each unique group has at least one select line different from the select lines of any other unique group. Each unique group also includes M of the N select lines, wherein M is greater than one and less than N. The maximum number of the devices may be equal to the total number of the unique groups of the N select lines. Additionally, at least one of the devices may be selected for communication by activating at least one of the unique groups.

A method for selectively enabling agents or selectable devices of a system using a plurality of N select lines is also described. The method includes the steps of: assigning each agent to a unique group M of the plurality of N select lines, M being greater than 1; translating an identification number into a combinatorial representation that specifies which of the plurality of N select lines are to be asserted; and asserting a first unique group of the plurality of N select lines to select one of the plurality of selectable devices.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A device selection scheme is described wherein a master (selecting device) selects one of a plurality of X agents (selectable devices) by selectively enabling a plurality M of a total of N select lines. Each agent has a distinct subset M of the N select lines that corresponds to that agent. More than one agent can be selected by asserting the select lines that correspond to the respective subsets of select lines for the selected agents. Similarly, all agents may be selected by asserting all N select lines. The device selection scheme described below may be used for systems supporting one to X agents, and is well suited for systems supporting in excess of approximately eight to ten agents.

The device selection scheme is referred to herein as "N choose M," wherein M is greater than one (1) and less than N. The term "N choose M" is related to the combinatorics theory of mathematics that states that, for a given number of N items, there is a maximum number of X unique combinations of the N items taken M at a time. For example, given a total of six (6) items, there are a total of fifteen (15) unique combinations of two (2) items. For the present device selection scheme, the number X defines the maximum number of agent devices that can be supported by the system, and the number M defines the number of select lines that are routed to each agent for selection purposes. For one embodiment, M is approximately one-half N.

As will be described, the N choose M device selection scheme offers a good compromise between the number of output pins allocated on the master and the number of input pins allocated on each agent for selection purposes. Furthermore, the N choose M device selection scheme eliminates the need to assign unique identification numbers to each device, enables the use of majority logic, and therefore reduces system latency when compared to some prior schemes.

Figure 4:
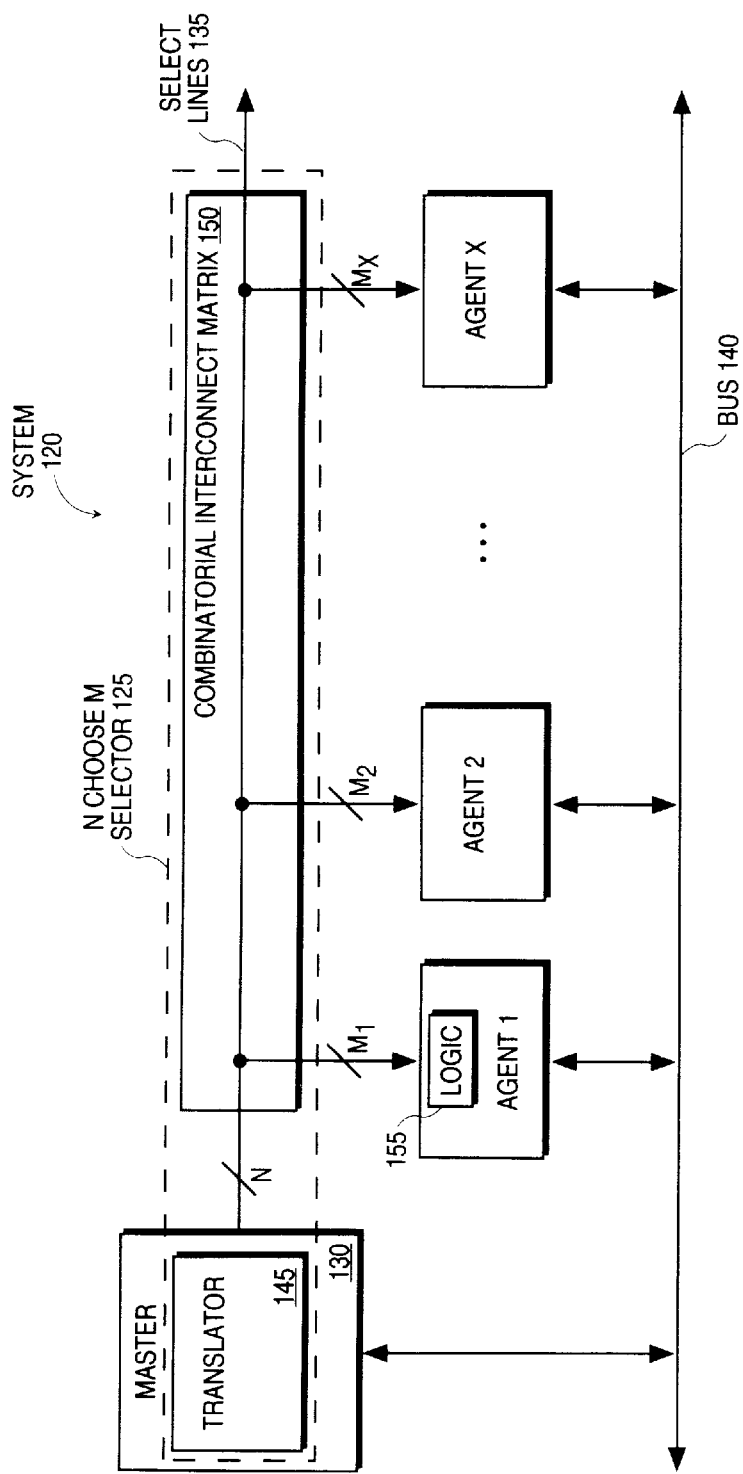
FIG. 4 shows one embodiment of a system that implements a scheme for device selection including an N choose M selector comprising a translator and a combinatorial interconnect matrix.

FIG. 4 shows an exemplary system 120 that implements an N choose M device selection scheme wherein N choose M selector 125 is used by master 130 to select one or more of X agents by asserting at least one of a unique subset M of N select lines 135. System 120 is a shared communication system, wherein selected agents may communicate data and/or control information with master 130 via bus 140. According to other embodiments, selected devices perform a predetermined task in response to being selected.

N choose M selector 125 includes translator 145 and combinatorial interconnect matrix 150. Translator 145 translates an identification number into a combinatorial representation that specifies which of the N select lines 35 are to be asserted. Translator 145 may translate binary, hexadecimal, BCD, or an identification number in any other format to a combinatorial representation. For one embodiment, translator 145 may comprise combinatorial logic. For another embodiment, translator 145 may comprise a table(s) that stores translation information. For yet another embodiment, translator 145 may comprise software routines that perform the translation function and are coupled to hardware to output the combinatorial representation on specific N select lines 135.

Combinatorial interconnect matrix 150 couples each agent to a unique subset M of the N select lines 135. Agent 1 is coupled to subset $M_1$, agent 2 is coupled to subset $M_2$, up to agent X coupled to subset $M_X$. Each agent is provided with majority logic 155, which may be, but is not limited to, a logical AND gate to determine when its subset of M signal lines are properly asserted.

One agent may be selected by properly asserting select signals on the requisite M subset of N select lines 135. System 120 also enables multiple agents to be simultaneously selected by enabling the proper subsets M of the N select lines 135. Additionally, all X agents may be simultaneously selected by asserting the proper select signals on the N select lines 135.

As used herein, the term "assertion" does not require that all select signals be set to a logic high or a logic low value to "assert" the select line; rather, each select signal be activated to the value expected by the agent in view of the configuration of the majority logic 155 for that agent.

As shown in FIG. 4, translator 145 may be provided on the same semiconductor substrate as the master 130. Alternatively, translator 145 may be provided on a different semiconductor substrate or as discrete circuitry that is distinct from the master 130. When translator 145 resides in master 130, the master 130 is provided with N output pins to support device selection. Regardless, each agent is provided with M input pins to support remote device selection. For some applications, such as when the plurality of agents are registers of a microprocessor, all of the components of system 120 may be provided on a single semiconductor substrate.

Figure 5:
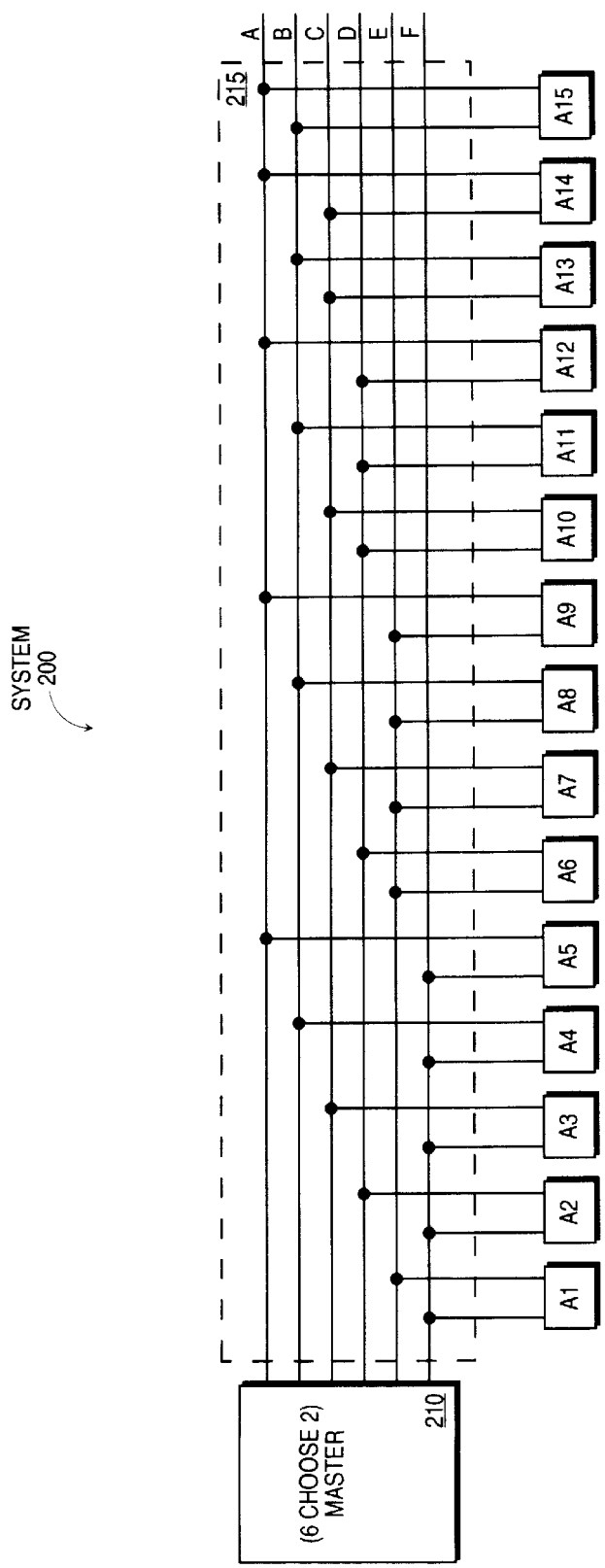
FIG. 5 shows a 6 choose 2 system for device selection according to one embodiment.

FIG. 5 shows a six (N=6) choose two (M=2) system 200 wherein a master 210 selects one or more of up to 15 (X=15) agents A1–A15 using six select lines A–F, wherein each agent A1–A15 is connected to a unique subset of two select lines. Combinatorial interconnect matrix 215 includes the hardwired connections of agents A1–A15 to select lines A–F. Alternative means for coupling A1–A15 to select lines A–F as shown in FIG. 5 may be employed including, fuses, diodes, resistors, and other means. The translator of system 200 is not shown, but may be internal or external to master 210.

To select agent A1, master 210 asserts the proper select signals on select lines E and F. To simultaneously select agents A1, A2, and A6, master 210 asserts the proper select signals on select lines D, E, and F. To simultaneously select all of agents A1–A15, master 210 asserts the proper select signals on select lines A–F.

According to one embodiment, a designer determines the numbers N and M to accommodate the desired number of agents for the system, wherein the maximum number X of agents supported by a particular system is equal to $$\frac{N!}{[(N-M)!M!]}.$$

Figure 1:
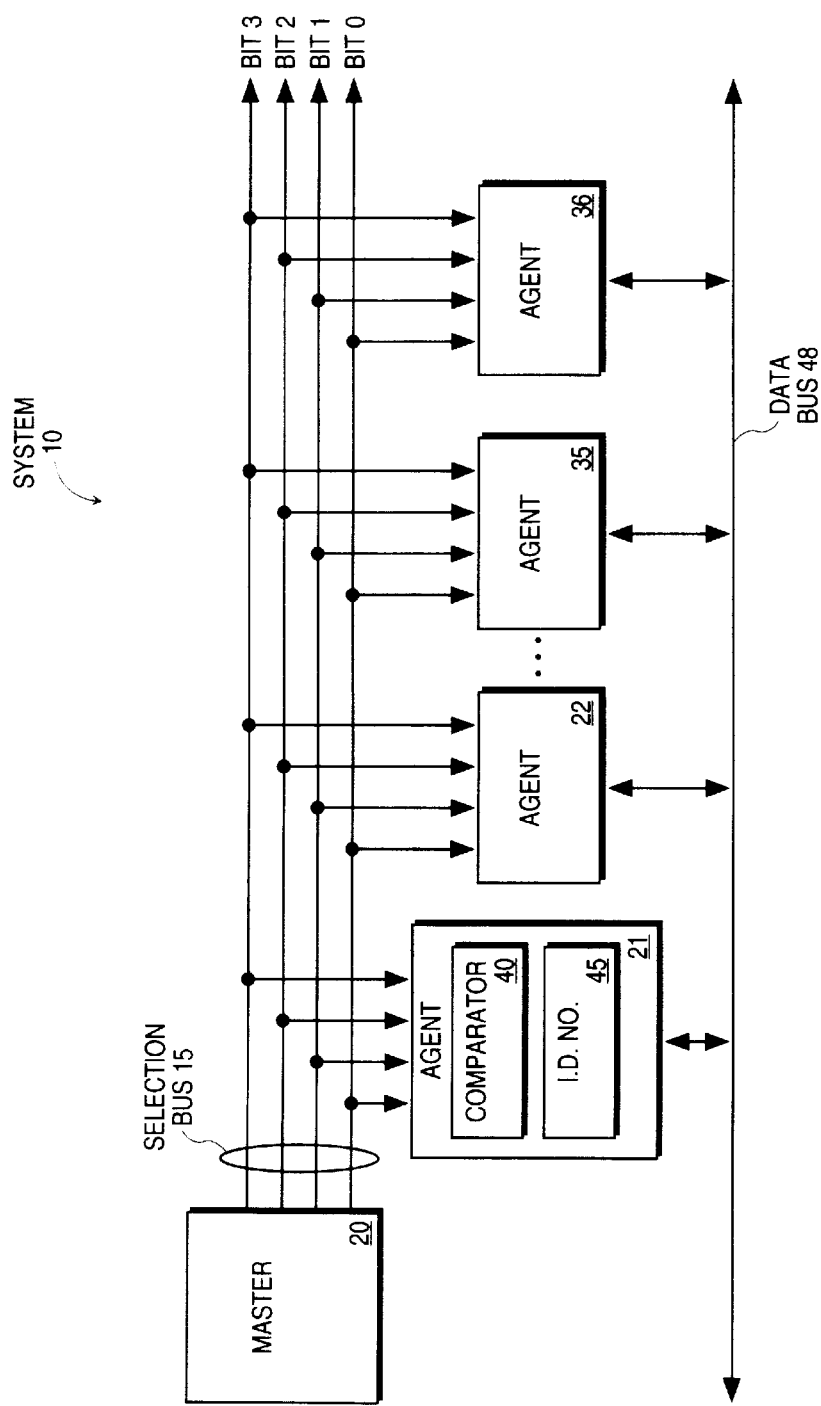
FIG. 1 shows a system that implements a first prior art scheme for device selection.
Figure 2:
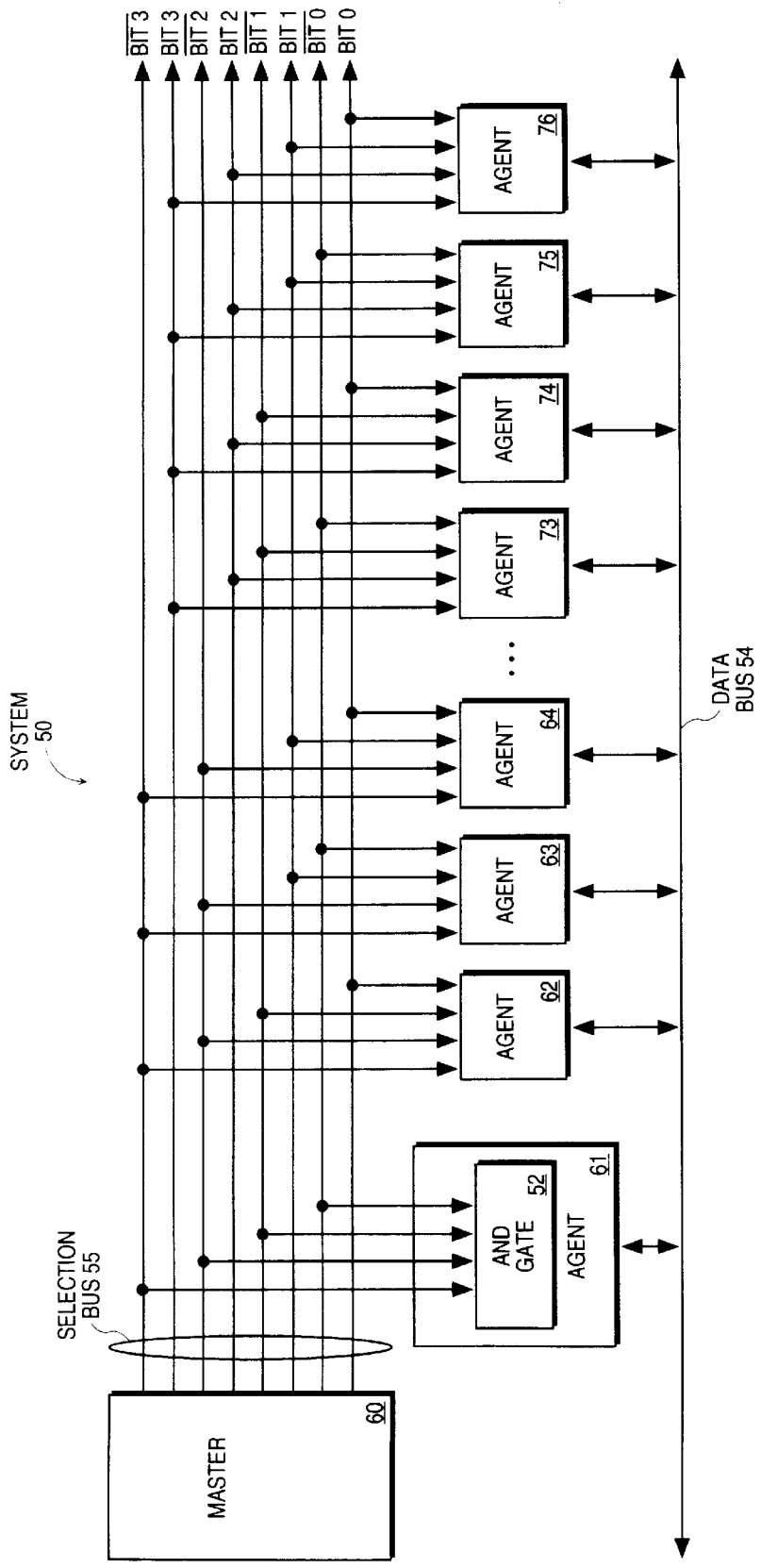
FIG. 2 shows a system that implements a second prior art scheme for device selection.
Figure 3:
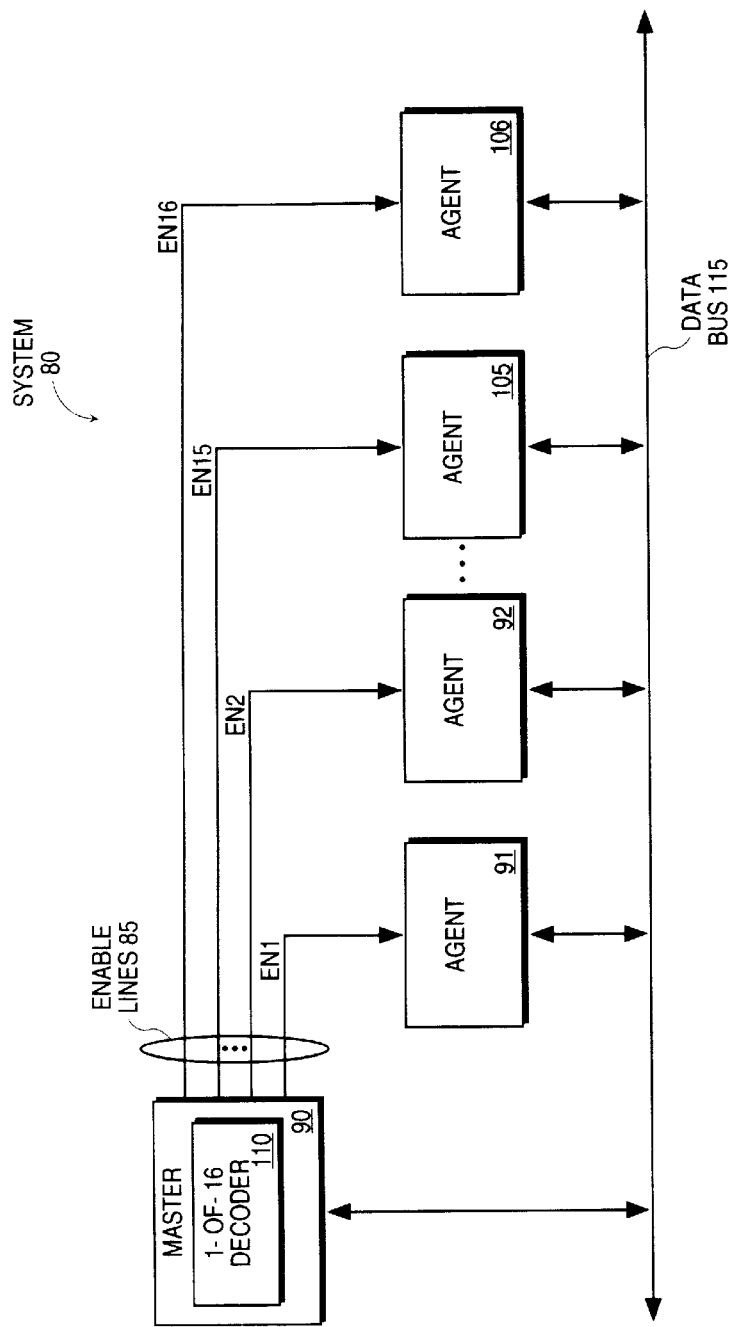
FIG. 3 shows a system that implements a third prior art scheme for device selection.

Tables 1 and 2 compare examples of the resources required by the N choose M scheme of the present embodiments when compared to the prior art schemes shown in FIGS. 1–3. Specifically, Table 1 shows the system requirements for implementing a 6 choose 2 scheme for selecting an agent from a maximum of approximately 16 agents (15 agents for FIG. 4), and Table 2 shows the system requirements for implementing a 7 choose 3 scheme for selecting an agent from a maximum of approximately 32 agents (35 agents for FIG. 4).

TABLE 1

|        | Master Outputs (N) | Agent Inputs (M) | Max. No. of Agents (X) | N*M*X |
|--------|--------------------|------------------|------------------------|-------|
| FIG. 4 | 6                  | 2                | 15                     | 180   |
| FIG. 1 | 4                  | 4                | 16                     | 256   |
| FIG. 2 | 8                  | 4                | 16                     | 512   |
| FIG. 3 | 16                 | 1                | 16                     | 256   |

TABLE 2

|        | Master Outputs (N) | Agent Inputs (M) | Max. No. of Agents (X) | N*M*X |
|--------|--------------------|------------------|------------------------|-------|
| FIG. 4 | 7                  | 3                | 35                     | 735   |
| FIG. 1 | 5                  | 5                | 32                     | 800   |
| FIG. 2 | 10                 | 5                | 32                     | 1600  |
| FIG. 3 | 32                 | 1                | 32                     | 1024  |

Tables 1 and 2, indicate that the number of inputs and outputs that must be allocated to the master and each agent is a compromise between the prior schemes such that the cost or burden of implementing the present device selection scheme is distributed between master 130, agents A1–AX, and combinatorial interconnect matrix 150. Tables 1 and 2 indicate, with the exception of the scheme of prior art FIG. 1, the N choose M scheme results in the lowest number of master outputs. Similarly, with the exception of the scheme of prior art FIG. 3, the N choose M scheme results in the lowest number of agent inputs.

Tables 1 and 2 further show that for N choose 2, the product of the number of master outputs (N), the number of agent inputs (M), and the maximum number of agents (X) supported by a device selection scheme is a minimum number for the device selection scheme illustrated in FIG. 4 relative to the prior art schemes illustrated in FIGS. 1–3.

Figure 6:
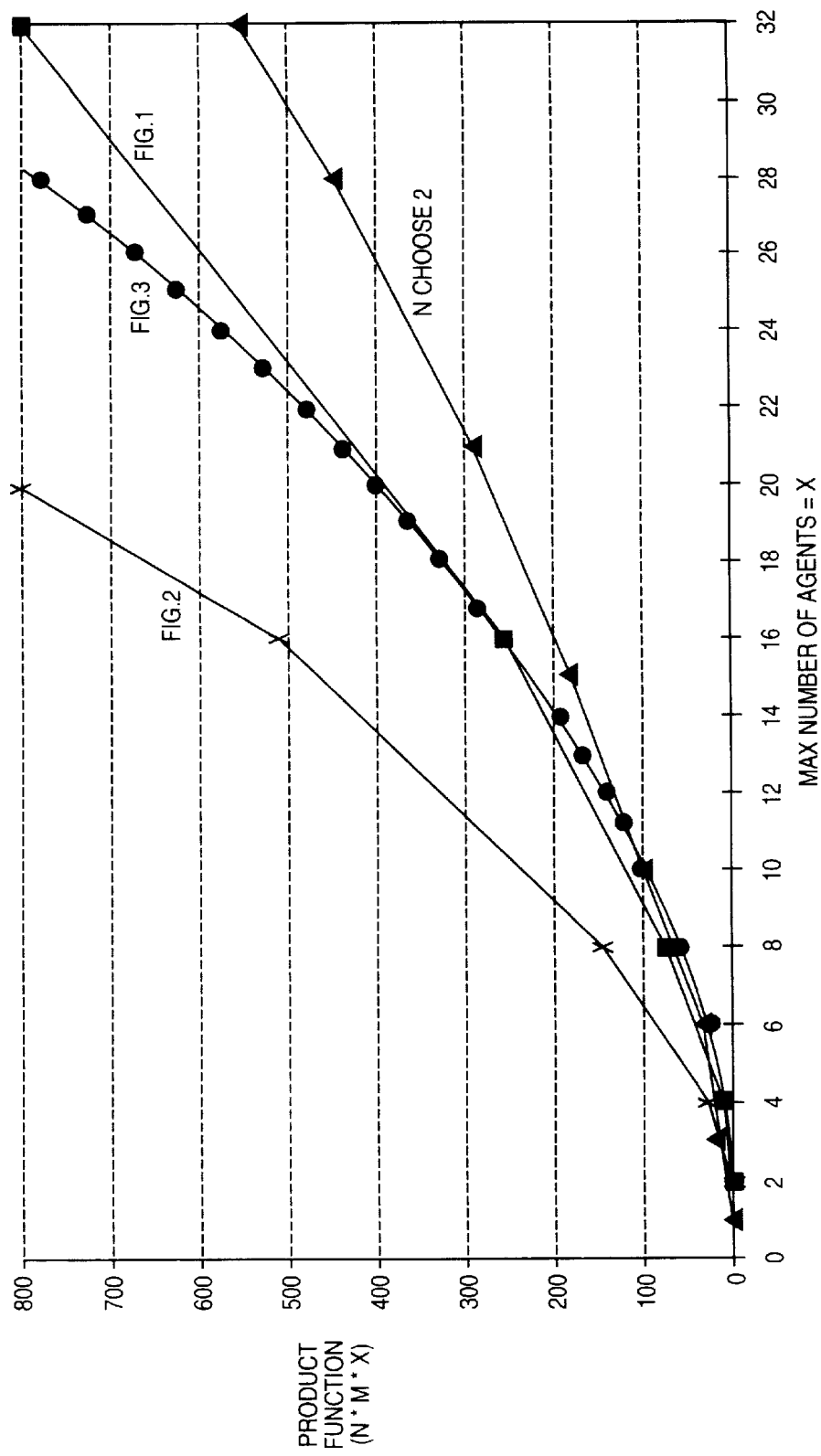
FIG. 6 shows a graph comparing the product of master outputs, agent inputs, and the maximum number of agents a system can support for one embodiment of a remote device selection scheme compared with prior art device selection schemes.

FIG. 6 shows that for systems that support in excess of approximately ten agents, an N choose 2 device selection scheme will yield a product function (N*M*X) that provides a minimum result for a system supporting X agents as compared with the prior art schemes of FIGS. 1–3.

Figure 7:
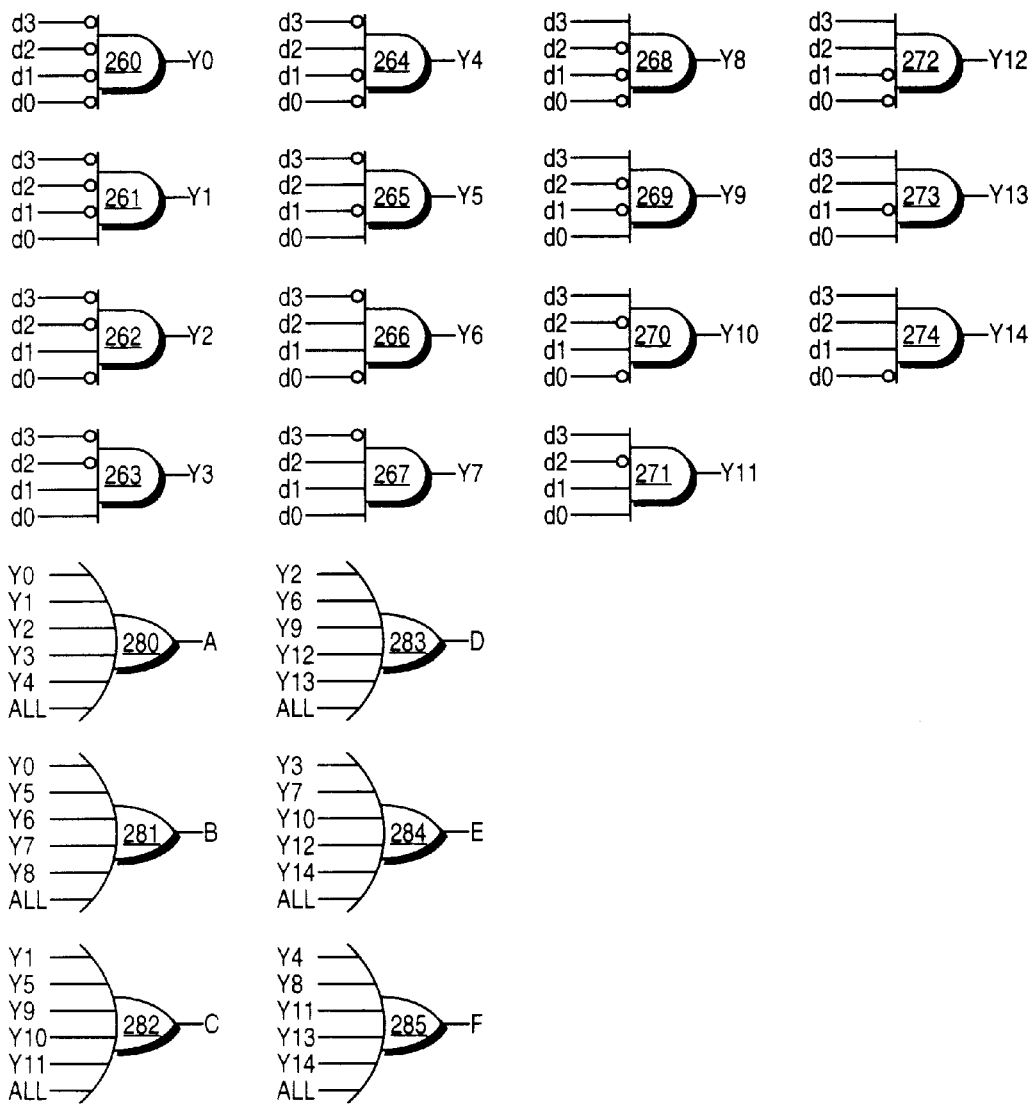
FIG. 7 shows a translator according to one embodiment.

FIG. 7 shows combinatorial translator 250 which is one embodiment of translator 145 in FIG. 4. Translator 250 is a 6 choose 2 binary-to-combinatorial translator that comprises fifteen (15) four-input logical AND gates 260–274 and six (6) six-input logical OR gates 280–285 for use in the 6 choose 2 system 200 of FIG. 5. Each of the AND gates 260–274 is coupled to receive four binary bits (d3, d2, d1, and d0) that correspond to sixteen possible identification numbers. As shown, each of the AND gates 260–274 has its inputs configured such that it will output a logic 1 only in response to a specific identification number. The outputs of the AND gates 260–274 are coupled to the inputs of the OR gates 280–285 in the manner shown such that the assertion of the output of one of the AND gates 260–274 results in two of the select lines A–F being asserted to select a corresponding agent. Each OR gate is also shown as including an "ALL" input that causes all of the select signals A–F to be asserted when the "ALL" signal is asserted.

The connections between logical AND gates 260–274 and logical OR gates 280–285 are implied by the designations Y0 . . . Y14 of the outputs of the AND gates 260–274 and the designations of the input signals to the OR gates 280–285. Note that a master may select none of the agents by setting each of the four binary bits d3–d0 to a high logic level. Alternative circuit configurations may be used to provide the translation function.

Figure 8:
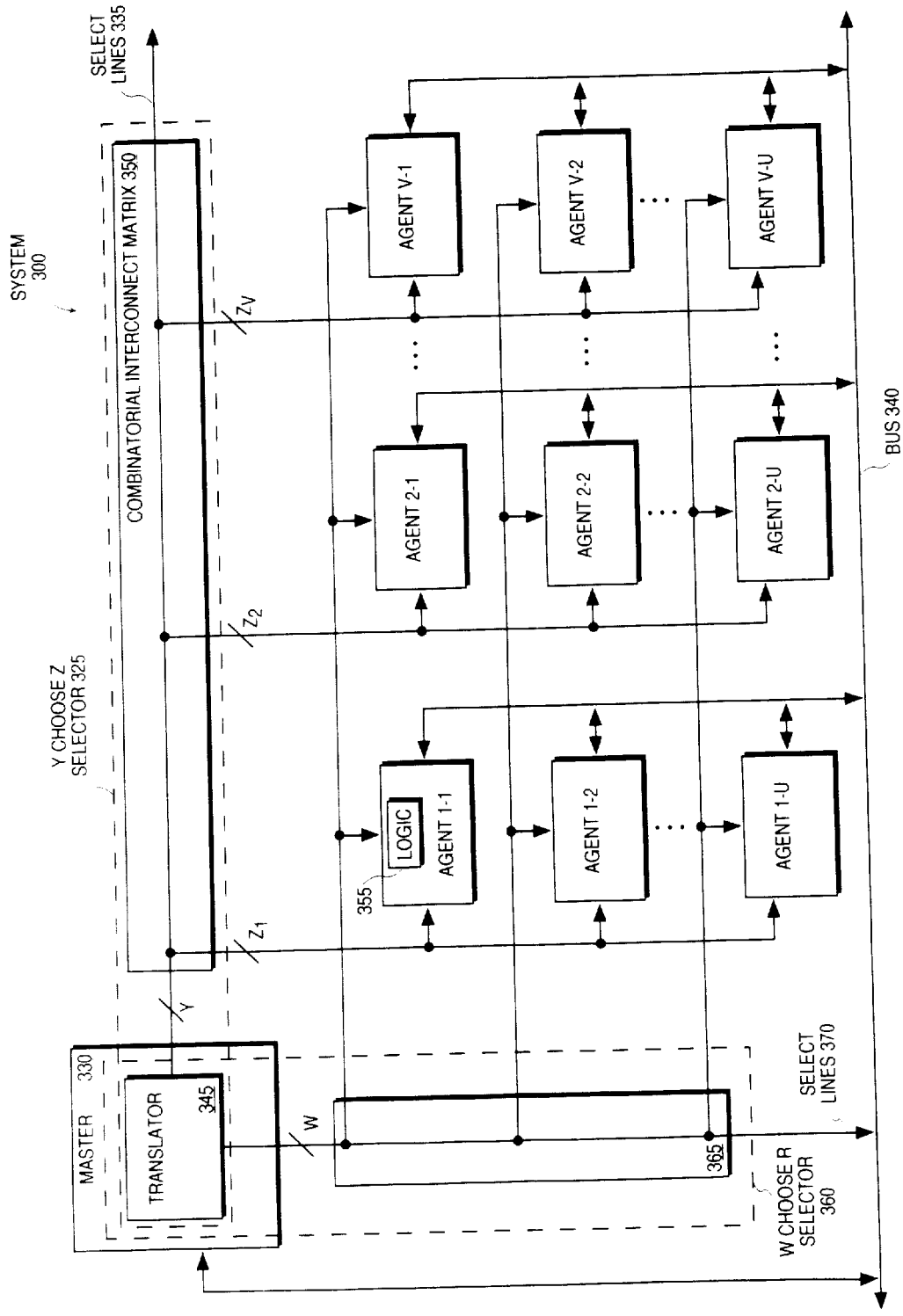
FIG. 8 shows one embodiment of a system that implements a scheme for device selection including two N choose M selectors each comprising a translator and a combinational interconnect matrix.

FIG. 8 shows system 300 that implements another device selection scheme. System 300 includes Y choose Z selector 325 and W choose R selector 360, each having an N choose M configuration as illustrated in FIG. 4. Y choose Z selector 325 enables selection of up to V devices, wherein V is equal to $$\frac{Y!}{[(Y-Z)!Z!]}.$$

Similarly, W choose R selector 360 enables selection of up to U devices, wherein U is equal to $$\frac{W!}{[(W-R)!R!]}.$$

Thus, system 300 supports the selection of one or more of V×U agents by asserting at least one unique subset Z of Y select lines 335 and/or at least one unique subset R of W select lines 370.

System 300 is a shared communication system, wherein selected agents may communicate data and/or control information with master 330 via bus 340. According to other embodiments, selected devices perform a predetermined task in response to being selected.

Y choose Z selector 325 includes translator 345 and combinatorial interconnect matrix 350. W choose R selector includes translator 345 and combinatorial interconnect matrix 365. Translator 345 translates a first identification number into a combinatorial representation that specifies which of the Y select lines 335 are to be asserted. Translator 345 also translates a second identification number into a combinatorial representation that specifies which of the W select line 370 are to be asserted. Translator 345 may translate binary, hexadecimal, BCD, or identification numbers in any other format to a combinatorial representation. For one embodiment, translator 345 may comprise combinatorial logic. For another embodiment, translator 345 may comprise a tables(s) that stores translation information. For yet another embodiment, translator 345 may comprise software routines that perform the translation functions and are coupled to hardware to output the combinatorial representation on specific Y and W select lines. For yet another embodiment, translator 345 may comprise two translators, namely: a first translator coupled to combinatorial interconnect matrix 350, translating the first identification number, and asserting the Y select lines 335; and a second translator coupled to combinatorial interconnect matrix 365, translating the second identification number, and asserting the W select lines 370.

Combinatorial interconnect matrix 350 couples each column of agents to a unique subset Z of the Y select lines 335. Similarly, combinatorial interconnect matrix 365 couples each row of agents to unique subset R of the W select lines 370. Agents 1-1 through 1-U are coupled to subset $Z_1$, agents 2-1 through 2-U are coupled to subset $Z_2$, up to agents V-1 through V-U coupled to subset $Z_V$. Similarly, agents 1-1 through V-1 are coupled to subset $R_1$, agents 1-2 through V-2 are coupled to subset $R_2$ up to agents 1-U through V-U coupled to subset $R_V$. Each agent includes majority logic 355 as illustrated in agent 1-1. Majority logic 355 may be, but is not limited to, a logical AND gate to determine when the appropriate subset of select lines is asserted for a particular agent.

One agent may be selected by properly asserting select signals on the requisite Z subset of Y select lines 335 and the requisite R subset of W select lines 370. System 300 may also enable multiple agents to be simultaneously selected by enabling the proper subsets Z of Y select lines 335 and/or the proper subset R of W select lines 370. For example, an entire row or column of agents may be simultaneously selected. Additionally, all V×U agents may be simultaneously selected by asserting the proper select signals on Y select lines 335 and W select lines 370.

Less agents are supported by system 300 than by a comparable system comprising a device selection scheme implementing (Y+W) choose (Z+R). For example, an 8 choose 4 system using one interconnect matrix according to FIG. 4 supports 70 selectable agents. In contrast, a comparable system including two 4 choose 2 matrices according to FIG. 8 supports (6×6) 36 selectable agents.

In some circumstances it may be desirable to employ system 300 over a device selection scheme implementing (Y+W) choose (Z+R) or other one interconnect matrix systems according to FIG. 4. For example, one may be motivated to use system 300 because either the encoding in the master would be simpler (i.e., the hardware or software of translator 345 would be simpler) or there would be a pin savings on the master device compared to other alternatives. For example, two 4 choose 2 matrices may select one or more of 36 devices using the configuration of system 300. In contrast, an 8 choose 4 system using only one interconnect matrix according to FIG. 4 supports up to 70 selectable devices, but may require more complex encoding hardware for translator 145 (relative to translator 345 ). For another alternative, an 9 choose 2 system using only interconnect matrix according to FIG. 4 may be used to support up to 36 selectable devices. This alternative has the disadvantage of requiring nine pins on the master device as opposed to 8 pins on the master device using two 4 choose 2 matrices according to system 300. The number of pins on the master devices may be important for some systems.

Figure 9:
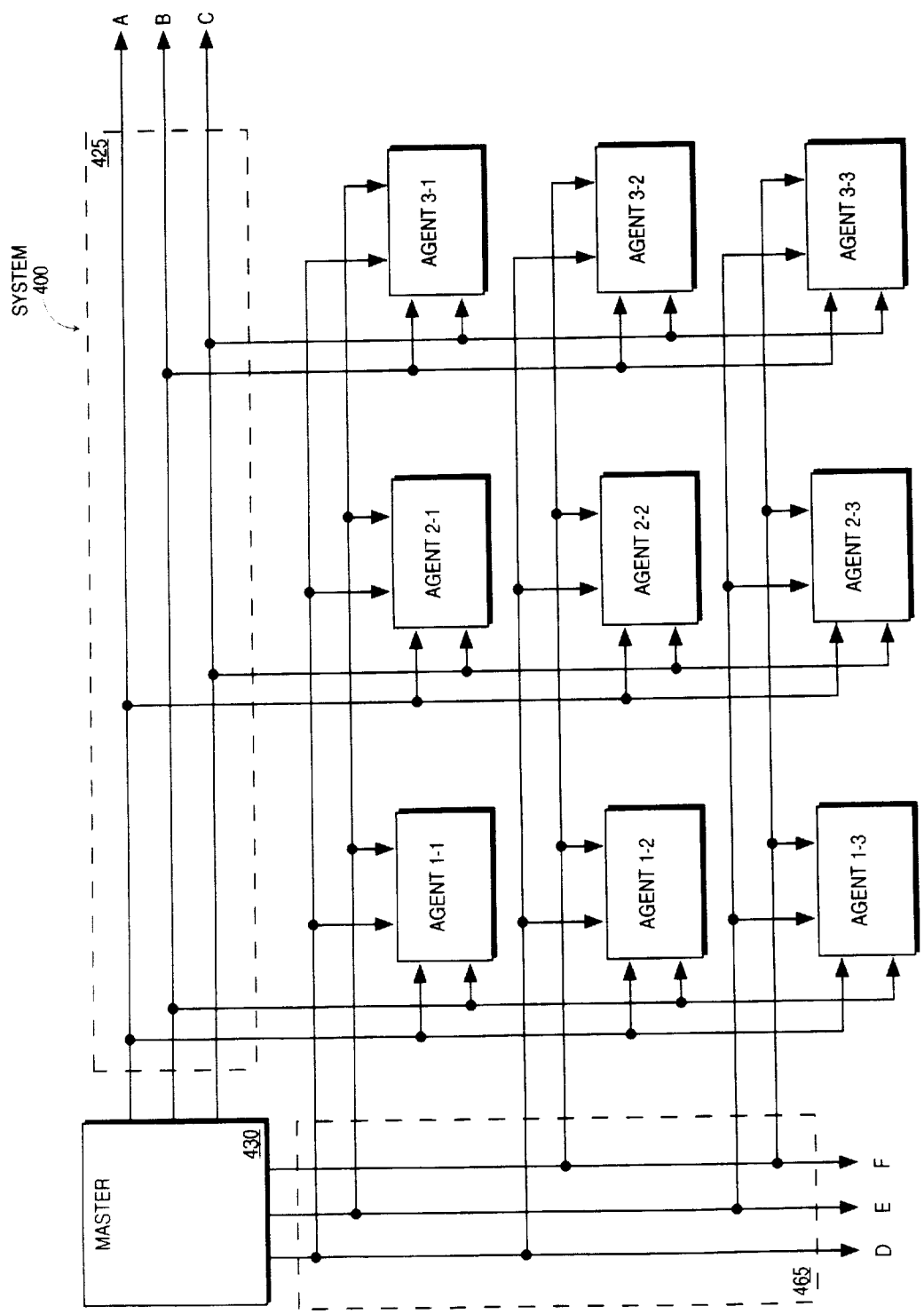
FIG. 9 shows a 6 choose 4 system for device selection according to one embodiment of FIG. 8.

FIG. 9 shows system 400 that is one embodiment of system 300 having two interconnect matrices each supporting 3 choose 2 device selection schemes. System 400 includes master 430, combinatorial interconnect matrix 425, combinatorial interconnect matrix 465, and agents 1-1 through 3-3. Master 430 is capable of selecting one or more of up to nine (9) agents via select lines A–F. The translator of system 300 is not shown, but may be internal or external to master 430.

Combinatorial interconnect matrix 425 includes hardwired connections for agents 1-1 through 3-3. The first column of agents 1-1 through 1-3 is coupled select lines A and B. The second column of agents 2-1 through 2-3 is coupled to select lines A and C. The third column of agents 3-1 through 3-3 is coupled to select lines B and C. Combinatorial interconnect matrix 465 includes hardwired connections for agents 1-1 through 3-3. The first row of agents 1-1 through 3-1 is coupled to select lines D and E. The second row of agents 1-2 through 1-3 is coupled to select lines D and F. The third row of agents 1-3 through 3-3 is coupled to select lines E and F.

Any individual agent may be selected. For example, to select agent 1-1, master 430 asserts the proper select signals on select lines A, B, D, and E. To simultaneously select the first row of agents 1-1 through 3-1, master 430 asserts the proper select signals on select lines A–E. To simultaneously select the first column of agents 1-1 through 1-3, master 430 asserts the proper select signals on select lines A, B, D, E, and F. To simultaneously select all of agents 1-1 through 3-3, master 430 asserts the proper select signal on select lines A–E.

System 400 support up to (3×3) 9 selectable agents. A comparable 6 choose 4 system according to FIG. 4 would support up to 15 selectable agents.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. An interconnect apparatus for selecting at least one of a plurality of selectable devices for communication, comprising:

a plurality of N select lines;

a plurality of connections arranged to couple each and every one of the plurality of selectable devices to a unique combination of M of the plurality of N select lines, wherein M is greater than one and less than N; and wherein the at least one of the plurality of selectable devices is selected for communication by activating at least one of the unique combinations of M of the plurality of N select lines.

2. The apparatus of claim 1, wherein the maximum number of the plurality of selectable devices is equal to $$\frac{N!}{[(N-M)!M!]}.$$

3. The apparatus of claim 1, wherein more than one but not all of the plurality of selectable devices is selected simultaneously for communication.

4. The apparatus of claim 1, wherein all of the plurality of selectable devices are selected simultaneously for communication.

5. A system comprising:

a first interconnect apparatus for selecting a subset of a plurality of selectable devices, the first interconnect apparatus comprising:

a plurality of N select lines;

a plurality of connections arranged to couple each of the plurality of selectable devices to an unique group of the plurality of N select lines, each unique group having at least one select line different from the select lines of any other unique group and each unique group comprising M of the plurality of N select lines wherein M is greater than one and less than N;

wherein a maximum number of the plurality of selectable devices is equal to a total number of the unique groups of the plurality of N select lines; and wherein the at least one device is selected for communication by activating at least one of the unique groups; and a second interconnect apparatus for selecting at least one of the subset of the plurality of selectable devices, said second interconnect apparatus comprising:

a plurality of Y select lines;

another plurality of connections coupling each of the plurality of selectable devices to an unique group of the plurality of Y select lines, each unique group of the plurality of Y select lines having at least one select line different from any other unique group and each unique group of the plurality of Y select lines comprising Z of the plurality of Y select lines wherein Z is greater than one and less than Y.

6. The system of claim 5, further comprising:
a master including a plurality of N outputs coupled to the plurality of N select lines, and a plurality of Y outputs coupled to the plurality of Y select lines.

7. The system of claim 5, wherein the maximum number of the plurality of selectable devices is equal to $$\frac{N!}{[(N-M)!M!]}$$

multiplied by $$\frac{Y!}{[(Y-Z)!Y!]}.$$

8. The system of claim 5, further comprising:
circuitry, within at least one of the plurality of selectable devices, sensing when at least one of the unique groups of M select lines and at least one of the unique groups of Z select lines is activated such that the at least one of the plurality of selectable devices is selected.

9. The interconnect apparatus of claim 1, wherein the number of unique combinations of M of the N select lines is equal to $$\frac{N!}{[(N-M)!M!]}.$$

10. A system comprising:
a plurality of selectable devices;
an interconnect apparatus for selecting at least one of the plurality of selectable devices for communication, the interconnect apparatus comprising:
a plurality of N select lines
a plurality of connections arranged to couple each of the plurality of selectable devices to an unique group of the plurality of N select lines, each unique group having at least one select line different from the select lines of any other unique group and each unique group comprising M of the plurality of N select lines wherein M is greater than one and less than N;
wherein a maximum number of the plurality of selectable devices is equal to a total number of the unique groups of the plurality of N select lines; and wherein the at least one device is selected for communication by activating at least one of the unique groups; and a translator that translates an identification number into a combinatorial representation that specifies one of the unique groups of the plurality of N select lines to be asserted to enable one of the plurality of selectable devices in response to the combinatorial representation.

11. The system of claim 10, further comprising a master that includes the translator and provides the identification number.

12. The system of claim 10, wherein the translator, the interconnect apparatus, and one of the plurality of selectable devices are formed on a single semiconductor substrate.

13. The system of claim 10, wherein the identification number indicates more than one of the plurality of selectable devices, wherein the translator asserts more than one of the unique groups of the plurality of N select lines to enable more than one of the plurality of selectable devices.

14. The system of claim 10, further comprising:
circuitry, within at least one of the plurality of the selectable devices, sensing when at least one unique group of the plurality of N select lines is activated such that the at least one of the plurality of selectable devices is selected.

15. The system of claim 10, wherein the plurality of selectable devices comprises selectable memory devices.

16. The system of claim 10, further comprising a master coupled to the translator and providing the identification number.

17. A controller device comprising:
a plurality of N outputs;
a translator circuit coupled to the plurality of N outputs, wherein:
the translator circuit translates an identification number into a combinatorial representation that specifies which of the plurality of N outputs are to be asserted;
the N outputs are asserted at least M outputs at a time, wherein M is greater than one and less than N; and
the controller device is capable of selecting a maximum of X selectable devices, wherein X is equal to $$\frac{N!}{[(N-M)!M!]}.$$

18. A method for selecting between a plurality of selectable devices, comprising the steps of:
assigning each and every one of the selectable devices to a unique combination of M of a plurality of N select lines wherein M is greater than one and less than N; and
asserting a first unique combination of the plurality of N select lines to select a first one of the plurality of selectable devices.

19. The method of claim 18, further comprising the step of:
asserting a second unique group of the plurality of N select lines that corresponds to a second selectable device to concurrently select the first and second selectable devices.

20. The method of claim 18, further comprising the step of:
asserting all of the plurality of N select lines to concurrently select all of the plurality of selectable devices.

21. The method of claim 18, further comprising separately asserting each unique combination of M of the plurality of N select lines to individually select $$\frac{N!}{[(N-M)!M!]}$$

selectable devices.

22. The method of claim 18, further comprising the step of:

translating an identification number into a combinatorial representation that specifies which of the plurality of N select lines are to be asserted.

23. A system comprising:

a master including a plurality of N select outputs a plurality of selectable devices; and, an interconnect apparatus arranged to couple each and every one of the plurality of selectable devices to a unique combination of M of the plurality of N select lines, wherein M is greater than one and less than N.

24. The system of claim 23, wherein the plurality of selectable devices is equal to $$\frac{N!}{[(N-M)!M!]}.$$

25. A system comprising:

an N choose M selector arranged to couple each and every one of a plurality of selectable devices to a unique combination of M of a plurality of N select lines, wherein M is greater than one and less than N; and $$\frac{N!}{[(N-M)!M!]}$$

groups of M of the plurality of N select lines.

26. The system of claim 25, further comprising $$\frac{N!}{[(N-M)!M!]}$$

selectable devices each coupled to a corresponding one of the $$\frac{N!}{[(N-M)!M!]}$$

groups of M of the plurality of N select lines.

27. The system of claim 25, wherein the N choose M selector comprises:

a translator circuit to translate an identification number into a combinatorial representation that specifies which of the unique combinations of M of the plurality of N select lines will be asserted by the N choose M selector; and an interconnect matrix coupled to the translator circuit and the $$\frac{N!}{[(N-M)!M!]}$$

groups of M of the plurality of N select lines.

* * * * *